US005722869A

United States Patent [19]

Raber et al.

[11] Patent Number: 5,722,869

[45] Date of Patent: Mar. 3, 1998

[54] SYSTEM AND METHOD FOR MANUFACTURING X-RAY TUBES HAVING METAL ENVELOPES UTILIZING A METAL DISK

[75] Inventors: Thomas Robert Raber, East Berne; Mark Gilbert Benz, Burnt Hills; Robert John Zabala, Schenectady, all of N.Y.

[73] Assignee: General Electric Company, Schenectady, N.Y.

[21] Appl. No.: 577,162

[22] Filed: Dec. 22, 1995

[51] Int. Cl.$^6$ .................... H01J 9/26; B23K 31/02

[52] U.S. Cl. .................... 445/3; 445/28; 445/43; 445/70; 228/15.1; 228/234.1

[58] Field of Search .................... 445/3, 28, 43, 445/53, 70; 65/34, 54; 228/221, 234.1, 15.1

[56] References Cited

U.S. PATENT DOCUMENTS

| | | | |
|---|---|---|---|
| 1,489,099 | 4/1924 | Reynolds | 65/59.25 |
| 1,915,361 | 6/1933 | Gustin | 65/54 |
| 2,946,641 | 7/1960 | Wisner | 65/34 |
| 4,578,043 | 3/1986 | Teshima et al. | 445/28 |
| 5,598,966 | 2/1997 | Romano et al. | 228/124.6 |

FOREIGN PATENT DOCUMENTS

| | | | |
|---|---|---|---|
| 62-271327 | 11/1987 | Japan | 445/3 |
| 2-75478 | 3/1990 | Japan | 228/221 |

OTHER PUBLICATIONS

Pending U.S. Patent Application Serial No. 08/538,144, filed Oct. 2, 1995, by Benz et al., entitled "Method For Manufacturing X-Ray Tubes".

*Primary Examiner*—Kenneth J. Ramsey
*Assistant Examiner*—Jeffrey T. Knapp
*Attorney, Agent, or Firm*—Ernest G. Cusick; William H. Pittman

[57] ABSTRACT

Improved systems and methods are disclosed for exhausting and combined exhausting and seasoning of x-ray tubes having metal envelopes for high performance x-ray systems having a rotating anode therein. The methods and systems for sealing a metal tubulation, having a diameter greater than about 20 mm and operatively connected to the x-ray tube metal envelope, to a metal disk positioned inside the metal tubulation, the metal disk having a smaller diameter than at least one portion of the metal tubulation include providing a vacuum connection to the metal tubulation and a heater positioned on the outside of the metal tubulation; heating the anode of the x-ray tube to temperatures inside the x-ray tube metal envelope of about 1500° C.; positioning the metal disk inside the metal tubulation proximate the position of the heater on the outside of the metal tubulation; heating the metal tubulation proximate the metal disk to a temperature sufficient to bond the metal disk to the metal tubulation; checking for bonding between the metal tubulation and the metal disk; and cooling the metal tubulation proximate the metal disk until the metal tubulation/metal disk connection is bonded.

23 Claims, 6 Drawing Sheets

SYSTEM AND METHOD FOR MANUFACTURING X-RAY TUBES HAVING METAL ENVELOPES UTILIZING A METAL DISK

RELATED APPLICATIONS

This application is related to commonly assigned U.S. Ser. No. 08/538,145, now U.S. Pat. No. 5,628,644 of Raber et al., and U.S. Ser. No. 08/538,144, filed Dec. 22, 1995 of Benz et al., the disclosure of each is incorporated by reference.

BACKGROUND OF THE INVENTION

The present invention relates to equipment for diagnostic and therapeutic radiology and methods of making the same and, more particularly, to methods for exhausting x-ray tubes during the manufacturing process.

Recently, it has been found that the internal vacuum obtained in the x-ray tube envelope has been only been about $1\times10^{-5}$ torrs. This internal vacuum has allowed "spitting" which occurs when the electrical path of the electron beam is diverted to some other point in the vacuum space rather than the focal track of the x-ray tube target. Spitting occurs because there are more particles left in the vacuum space that can attract the electrons being generated. Additionally, the manufacturing process called "exhaust" presently requires up to thirty hours to complete, which is entirely too long in the manufacturing process.

Current manufacturing "exhaust" practice utilizes a small about ½" to about ¾" inside diameter tubulation connected to a turbomolecular pump having a pumping speed of approximately I liter per second as measured at the x-ray tube target. As is known, pumping speed or conductance is directly related to the inside diameter of the pumping port or tubulation. While length of the tube does have an effect, it is much less than the effect of the diameter.

During x-ray tube manufacturing, the exhaust port of the envelope/tubulation connection of the x-ray tube is sealed off after evacuation by the standard glass blowing technique of thermal collapse, fusion and separation of the small diameter (1 to 2 cm inside diameter) exhaust tubulation. The lowest pressure that can be achieved with the current configuration is limited by the conductance of the exhaust tubulation. The conductance (c) of this tube is proportional to the diameter (d) and to the length (I):

$$c \sim d^3/l \qquad [1]$$

To achieve lower pressures, the conductance must be increased. To increase the conductance, a larger diameter exhaust tubulation must be used.

Post "exhaust" process inspection has revealed that the method described above may be insufficient to provide effective removal of the gases evolved during the exhaust process and thereby leave the x-ray tube enclosure with a high pressure condition which in turn has been related to early failure of the assembly in the field. The "exhaust" process method had not been changed to a larger diameter pumping port or tubulation because of the past inability to effectively seal the envelope/tubulation connection after the completion of the "exhaust" process step.

The seal-off configuration described did not work with larger diameter tubulations. The "thermal collapse" phase became extremely unstable and the tubulation buckled in an uncontrollable fashion. Effective "fusion" of the buckled tubulation was not possible with this prior configuration.

Due to unacceptable failures after seasoning and prior to being shipped, the need for an improved x-ray tube having an envelope evacuated to about $1\times10^{-5}$ torr that would reduce or possibly eliminate the spitting while shortening the manufacturing cycle became apparent. Such an x-ray tube envelope would have the exhaust process or a combination exhaust and seasoning process during the manufacturing process effective to evacuate the x-ray tube envelope to greater than about $1\times10^{-5}$ torr, reducing the particles left in the vacuum space that could attract the electrons being generated such that failure due to "spitting", which occurs when the electrical path of the electron beam is diverted to some other point in the vacuum space rather than the focal track of the target, would be significantly reduced, if not eliminated and reduce the about thirty (30) hours presently required to complete the exhaust process step.

SUMMARY OF THE INVENTION

In carrying out the present invention in preferred forms thereof, we provide improved methods for the manufacture of x-ray tubes, such as those incorporated in diagnostic and therapeutic radiology machines, for example, computer tomography scanners. Illustrated methods of the invention disclosed herein, are in the form of methods for exhausting and for exhausting and seasoning an x-ray tube envelope for use in x-ray systems.

One specific method of the present invention includes, a method for exhausting an x-ray tube envelope utilizing a large diameter glass tubulation comprising the steps of: providing a tubulation having a diameter greater than about 20 mm; operatively connecting the tubulation to the x-ray tube envelope; providing a disk inside the tubulation, the disk having a smaller outside diameter than the inside diameter of the tubulation; providing a vacuum to the tubulation; positioning heating means proximate the outside of the tubulation; heating the anode of the x-ray tube inside the x-ray tube envelope to a temperature of about 1500° C.; positioning the disk inside the tubulation proximate the position of the heating means on the outside of the tubulation; heating the tubulation proximate the disk sufficient to collapse the tubulation into the disk while limiting the stress to the tubulation material; checking for sealing contact between the tubulation and the disk; and cooling the tubulation/disk interface to a temperature sufficient to seal the tubulation to the disk.

Another aspect of the present invention includes a method for exhausting and seasoning an x-ray tube envelope utilizing a large diameter tubulation comprising the steps of: providing a tubulation having a diameter greater than about 20 mm; operatively connecting the tubulation to the x-ray tube envelope; providing a disk inside the tubulation, the disk having a smaller diameter than the tubulation; providing a vacuum to the tubulation; positioning heating means on the outside of the tubulation; operating the x-ray tube to generate x-rays and generate temperatures inside the x-ray tube envelope of about 1500° C.; positioning the disk inside the tubulation proximate the position of the heating means on the outside of the tubulation; heating the tubulation proximate the disk to about 1300° C.; checking for sealing contact between the tubulation and the disk; and cooling the tubulation proximate the disk to a temperature sufficient to seal the tubulation to the disk.

One other aspect of the present invention includes a method of sealing off a large diameter tube under vacuum comprising the steps of: providing a tube; providing a disk inside the tube, the disk having a smaller diameter than the tube; providing a vacuum to the tube; positioning heating means on the outside of the tube; positioning the disk inside the tube proximate the position of the heating means on the outside of the tube; heating the tube proximate the disk to a temperature sufficient to collapse the tube into the disk; checking for sealing contact between the tube and the disk; and cooling the tube proximate the disk sufficiently to formulate a seal between the tube and the disk where the disk collapsed into the disk.

Accordingly, an object of the present invention is to provide an improved exhausting method during the manufacturing process of an x-ray tube.

Another object of the present invention is to provide a exhausting method requiring less time to complete during the manufacturing process of an x-ray tube.

Other objects and advantages of the invention will be apparent from the following description, the accompanying drawings and the appended claims.

DESCRIPTION OF THE PREFERRED EMBODIMENT

Typical x-ray tubes are normally enclosed in an oil-filled protective casing. An envelope, typically glass, contains a cathode plate, a rotating disc target and a rotor that is part of a motor assembly that spins the target. A stator is provided outside the tube proximate to the rotor and overlapping therewith about two-thirds of the rotor length. The glass envelope is conventionally enclosed in an oil-filled lead casing having a window for the x-rays that are generated to escape the tube. The casing in some x-ray tubes may include an expansion vessel, such as a bellows.

X-rays are produced when, in a vacuum, electrons are released, accelerated and then abruptly stopped. This takes place inside the x-ray tube envelope. To release electrons, the filament in the tube is heated to incandescence (white heat) by passing an electric current through it. The electrons are accelerated by a high voltage (ranging from about ten thousand to in excess of hundreds of thousands of volts) between the anode (positive) and the cathode (negative) and impinge on the anode, whereby they are abruptly slowed down. The anode, usually referred to as the target, is often of the rotating disc type, so that the electron beam is constantly striking a different point on the anode perimeter. The x-ray tube is conventionally enclosed in a protective casing that is filled with oil to absorb the heat produced. High voltages for operating the tube are supplied by a transformer (not shown). The alternating current is rectified by means of rectifier tubes (or "valves") in some cases by means of barrier-layered rectifiers.

For therapeutic purposes—e.g., the treatment of tumors, etc.—the x-rays employed are in some cases generated at much higher voltages (over 4,000,000 volts). Also, the rays emitted by radium and artificial radiotropics, as well as electrons, neutrons and other high speed particles (for instance produced by a betatron), are used in radio therapy.

Figure 1A:
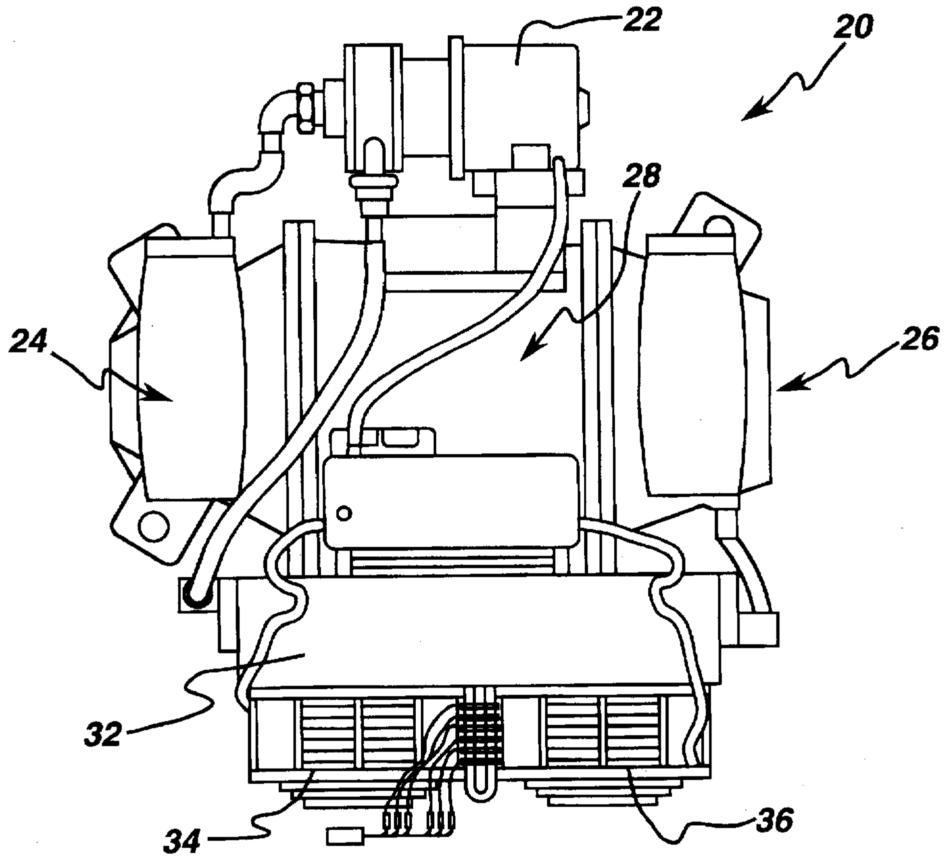
FIG. 1*a* is a plan view of a representative x-ray system having an x-ray tube positioned therein.
Figure 1B:
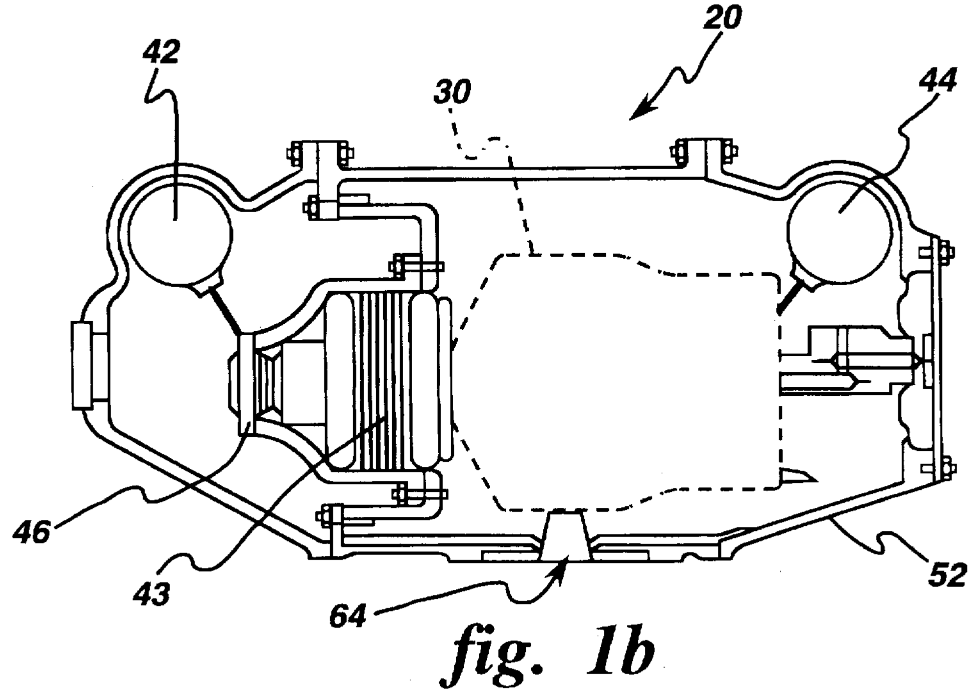
FIG. 1*b* is a sectional view with parts removed of the x-ray system of FIG. 1*a;*

A typical x-ray system is illustrated as generally designated by the numeral 20 in FIGS. 1*a,* 1*b* and 2. As can be seen, the system 20 comprises an oil pump 22, an anode end 24, a cathode end 26, a center section 28 positioned between the anode end and the cathode end, which contains the x-ray tube 30. A radiator 32 for cooling the oil is positioned to one side of the center section and may have fans 34 and 36 operatively connected to the radiator 32 for providing cooling air flow over the radiator as the hot oil circulates therethrough. The oil pump 22 is provided for circulating the hot oil through the system 20 and through the radiator 32, etc. As shown in FIG. 1*b*, electrical connections are provided in the anode receptacle 42 and the cathode receptacle 44.

Figure 2:
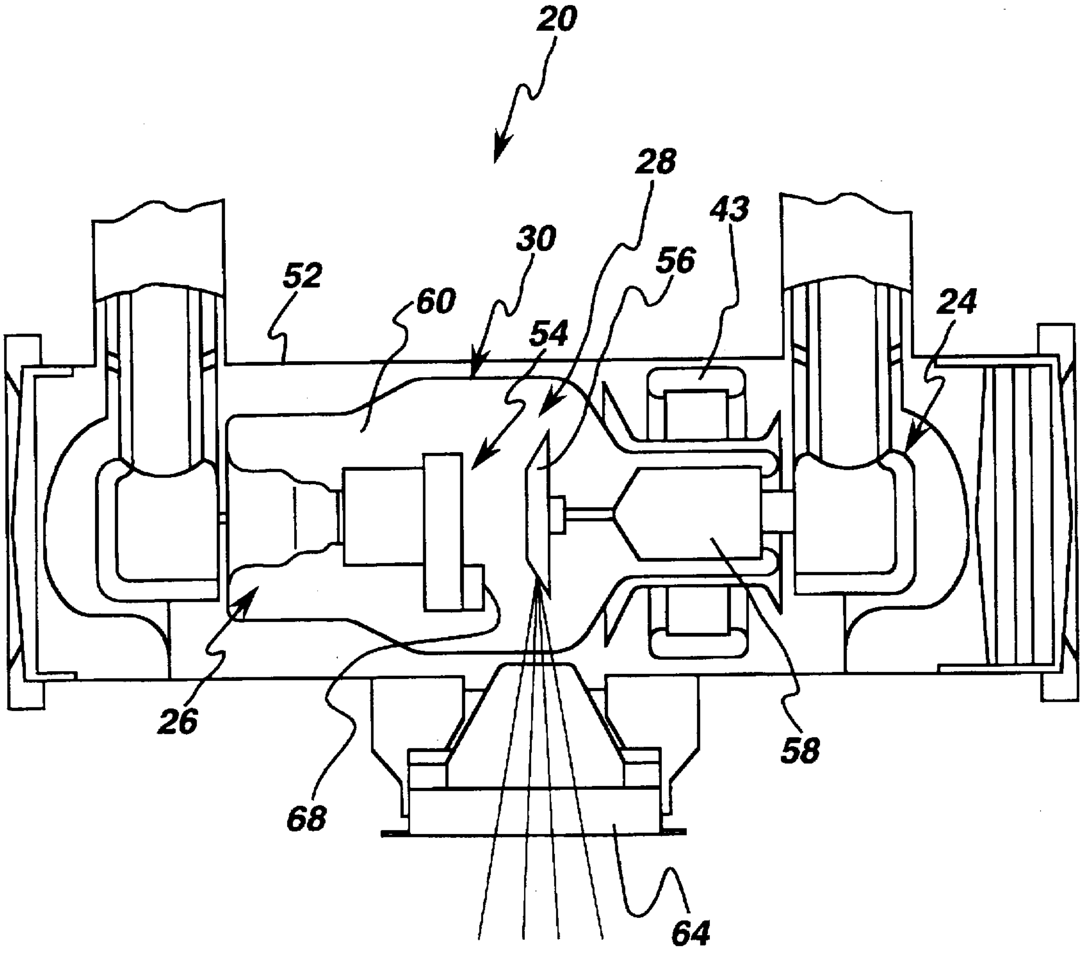
FIG. 2 is a schematic representation of another representative x-ray system.

As shown in FIG. 2, the x-ray system 20 comprises a casing 52 preferably made of aluminum and lined with lead and a cathode plate 54, a rotating target disc 56 and a rotor 58 enclosed in a conventional glass envelope 60. A stator 43 is positioned outside the glass envelope 60 inside the lead lined casing 52 relative to the rotor 58. The casing 52 is filled with oil for cooling and high voltage insulation purposes as was explained above. A window 64 for emitting x-rays is operatively formed in the casing 52 and relative to the target disc 56 for allowing generated x-rays to exit the x-ray system 20.

As stated above, very high voltages and currents are utilized in the specific x-ray tube and range from an approximate voltage maximum 160 KV to an approximate minimum of 80 KV and from an approximate current maximum of 400 ma to an approximate minimum of 250 ma.

Figure 3:
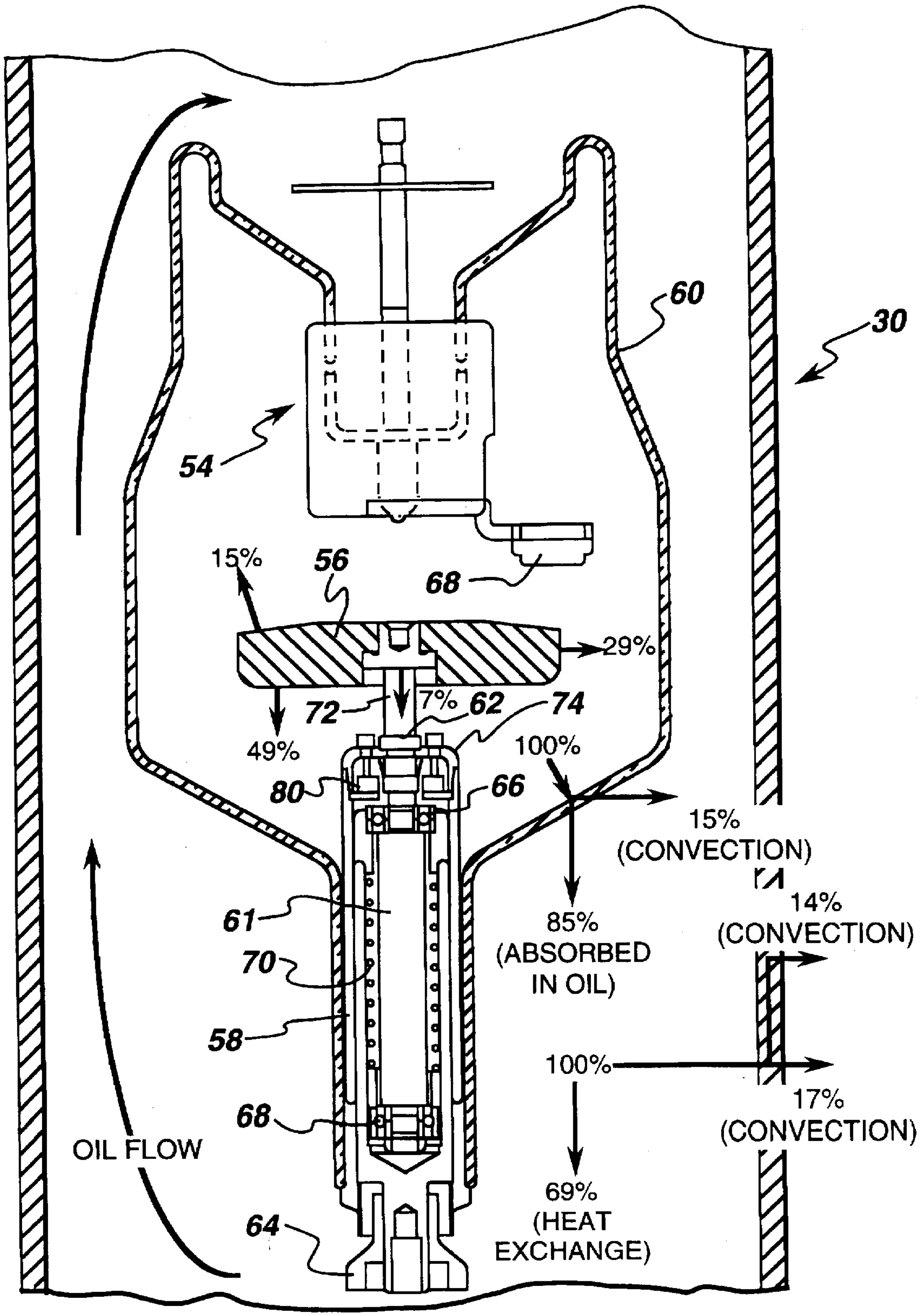
FIG. 3 is a partial sectional view of an x-ray tube illustrating representative thermal paths.
Figure 4:
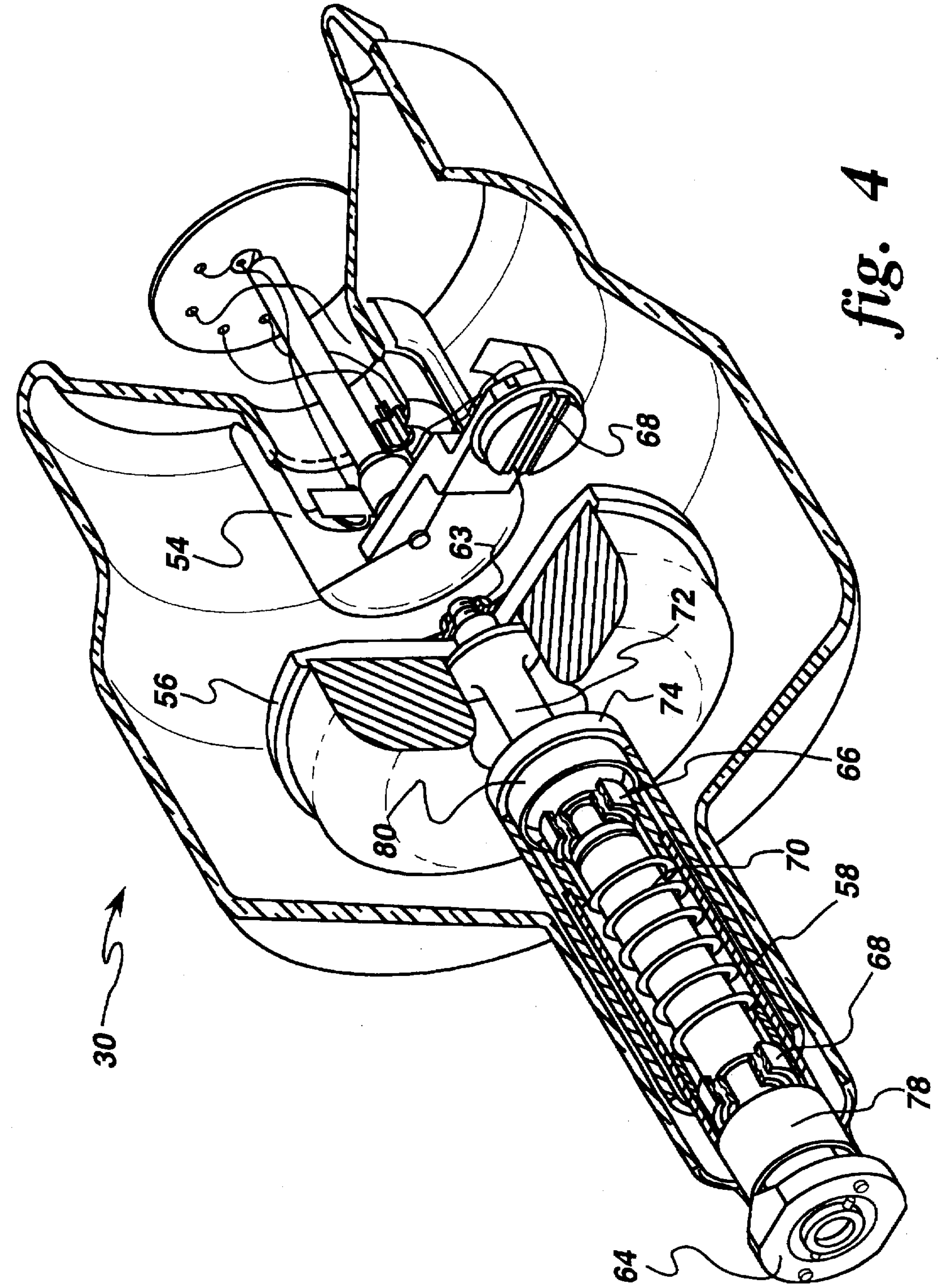
FIG. 4 is a partial perspective view of a representative x-ray tube with parts removed, parts in section, and parts broken away.

As shown in FIGS. 3 and 4, the cathode 54 is positioned inside the glass envelope 60. As is well known, inside the glass envelope 60 there is suppose to be a vacuum of about $10^{-5}$ to about $10^{-9}$ torr at room temperature. The electricity generates x-rays that are aimed from the cathode filament 68 to the anode target or the top of the target disc 56. The target disc is operatively connected to a rotating shaft 61 at one end by a Belleville nut 62 and by another nut at the other end 64. A front bearing 66 and a rear bearing 68 are operatively positioned on the shaft 61 and are held in position in a conventional manner. The bearings 66 and 68 are usually silver lubricated and are susceptible to failure at high operating temperatures.

A preload spring 70 is positioned about the shaft 60 between the bearings 66, 68 for maintaining load on the bearings during expansion and contraction of the anode assembly. A rotor stud 72 is utilized to space the end of the rotor most proximate the target 56 from the rotor hub 74. The bearings, both front 66 and rear 68, are held in place by bearing retainers 78 and 80. The rotor assembly also includes a stem ring and a stem all of which help to provide for the rotation of the rotor 58 with the target 56.

As stated above, the prior manufacturing exhaust process practice for exhausting or evacuating the gases from the interior of the envelope utilizes a small (about ½" inch to about ¾") inside diameter tubulation connected to a turbomolecular pump having a pumping speed of approximately one liter per second at the target. As is also discussed above, the prior manufacturing process did not work with a larger diameter tubulation because the "thermal collapse" phase becomes extremely unstable and the tubulation buckles in an uncontrollable fashion.

As mentioned above, during the prior manufacturing "exhaust" processes, the x-ray tube envelope had apparently not been fully exhausted, resulting in x-ray tube failures. Thus, it is important to attain a lower internal vacuum in the x-ray tube envelope during the manufacturing process and specifically during the exhaust process. Specifically, a vacuum of about $1\times10^{-6}$ to about $1\times10^{-8}$ torr is believed to be adequate.

It is believed that such an internal vacuum would provide more room within the envelope for the outgassing of components when the x-ray unit is in service before a high pressure condition in the envelope is reached that would shut the x-ray system off.

Recently, one "exhaust" process was being performed utilizing an about 12.5 mm vacuum tubulation connected to an x-ray tube envelope. As is known, "Spitting" can occur when there are relatively more particles left in the vacuum space inside the envelope that can attract the electrons being generated. Envelopes evacuated or exhausted using the 12.5 mm vacuum tubulation connected to an x-ray tube envelope and a one (1) liter/sec pumping speed have experienced failures due to Spitting. In other words, the vacuum inside the envelope was less than desired.

The amount of time needed to complete the exhaust portion or step during the x-ray tube manufacturing process is an important consideration. If the x-ray tube is to pass inspection on the first try after the "exhaust" process or step, up to thirty (30) hours had been needed to complete the "exhaust" process or step. If the first try was unacceptable, several additional attempts may have been needed before a decision relative to having attained an acceptable vacuum inside the envelope was reached.

It has been found that, by utilizing a large diameter vacuum tubulation, exhaust process time has been reduced to about ten (10) hours from the about thirty (30) hours previously required. Additionally, an increased potential for passing final test on the first attempt because of the lower starting pressure in the envelope has been realized.

One improved method included an improved connection to a high performance x-ray tube envelope in order to improve the part of the manufacturing process known as "exhaust". During the "exhaust" process, the anode portion of the x-ray tube is typically placed in an envelope, presently preferably made of Pyrex, glass, and evacuated to about $1\times10^{-6}$ to about $1\times10^{-9}$ torr. The x-ray tube anode is then heated, for example by induction heating, in order to remove gases from the envelope that are evolved when any material is heated. Compositions of CO, $CO_2$, $H_2O$, $N_2$, $O_2$, etc. are driven out of the anode materials into the envelope and then evacuated from the envelope by a vacuum pump, as discussed above. This basic approach could be used with some necessary modification if other materials such as for example, metal/ceramic materials, are found to be acceptable for use as x-ray tube envelopes.

Figure 5:
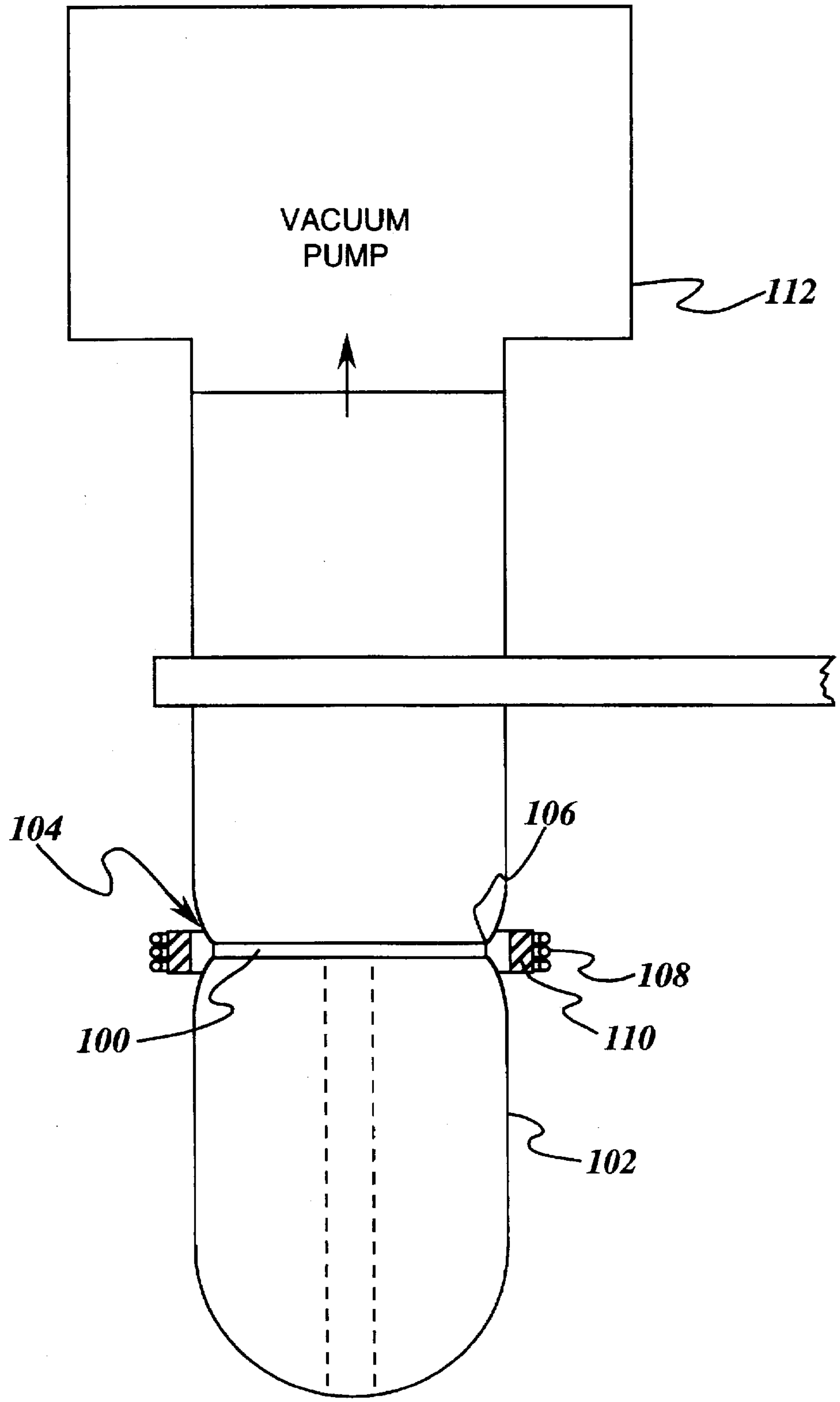
FIG. 5 is a sectional view of a representative large diameter tubulation of the tubes that would be used for the exhausting and/or the seasoning of an x-ray tube during the manufacturing process.

As illustrated in FIG. 5, a bulkhead or disk 100, presently preferably made of glass, positioned inside the larger diameter tubulation 102 is used during the seal-off of the tubulation/envelope connection. Initially, during the "exhaust" process, the bulkhead 100 is positioned so that it does not interfere with the evacuation of the gases from inside the envelope. For the seal-off of the envelope/tubulation connection, the bulkhead 100 is moved to a location selected for the seal-off. During the "thermal collapse" phase of the seal-off, the heated portion 104 of the large diameter tubulation 102 shrinks down or collapses until it contacts the bulk head 100. The small displacement (about 1/16inch to about 1/8inch) required between the inner surface of the tubulation 102 and the outer surface 106 of the bulkhead 100 can be achieved without the tubulation buckling. The "fusion" phase then takes place between the tubulation 102 and the bulkhead 100 to complete the seal-off of the tubulation/envelope connection thereby retaining the vacuum inside the envelope.

The following method describes how a seal off can be accomplished utilizing larger diameter tubulations such as about 20 mm to as large a diameter as practicable.

FIG. 5 illustrates an induction coil 108 and a graphite ring 110 utilized in one method. The graphite ring length may be varied to suit the particular x-ray tube envelope seal-off application, or any envelope requiring a faster more complete evacuation/lower vacuum inside thereof.

Power is supplied to the heating means, as illustrated an induction coil 108, which in turn heats the graphite ring 110 to a temperature sufficient to cause the illustrated Pyrex, glass tubulation wall to collapse while under vacuum. This collapse phase is stabilized by the sealing bulkhead or disk 100 which is positioned within the tubulation 102 at the location of the desired seal between the envelope and the tubulation. The temperature of the graphite 110 may be monitored by an optical pyrometer or other known means for monitoring temperature and at least one heating and cooling schedule has been defined which has been successful in providing for a controlled collapse and anneal of the tubulation to the disk.

It is believed that resistance heating, with proper element design, could be utilized to accomplish the same type of seal off. One example of such a device is a split furnace made up of two half cylinders, with air diameters presently available from about 100 mm to about 400 mm. Such split furnaces can be adapted for use up to 1600° C. for continuous operations, for creep testing, bilatometers and most other standard tests.

In one implementation, a large diameter tubulation with high conductance pumping is utilized in the "exhaust" process or step with the bulk target anode temperature being increased from the current about 1150° C. to about 1500° C.

Example 1

An x-ray tube envelope is fitted with a large diameter vacuum tubulation 45 mm to about as large a diameter as practicable with about 59 mm presently being preferred. A resistance type tube furnace is fitted over the tubulation to perform the seal-off after the process step of "Exhaust" is completed. A split furnace could also be used. Vacuum connections are made to a turbomolecular vacuum pump. Vacuum system conductance of about 25 liter/sec or greater is preferred, as calculated at the target. The envelope is processed through the "exhaust" step, which includes a resistance bakeout at about 450° C. and induction heating of the anode to about 1500° C.

With the x-ray tube envelope still being evacuated, a sealing bulkhead or disk 100 is positioned inside the tubulation 102 at the desired sealing location. The resistance furnace is then centered on the disk. A preprogrammed heating ramp is then started. The vacuum pump is on throughout the entire "Exhaust" process step in order to remove outgas products, believed to be primarily water vapor, developed, by heating the glass envelope. A very localized region 104 (about ⅛ inch to about ¼ inch in length) of the tubulation wall is heated to a temperature just above the softening point of the illustrated Pyrex, glass or other material used as the envelope and tubulation connecting the pump 112 to the envelope.

As the temperature of the localized region of the tubulation wall rises, the forces applied by the vacuum collapse the tubulation's walls onto the sealing disk. This temperature is held for about two (2) to about five (5) minutes to provide for good fusion of the tubulation wall to the sealing disk. The temperature at the collapse point is then lowered per a defined annealing schedule.

One heating and cooling schedule which produced an acceptable envelope/tubulation seal follows: Heat the graphite ring to about 700° C. in about 2 minutes; Heat the graphite ring to about 870° C. in about 2:45 minutes; Hold the temperature of the graphite ring at 870° C. for about 1 minute; Heat the graphite ring to about 1200° C. in about 5:30 minutes; Heat the graphite ring to about 1300° C. in about 7:00 minutes; Hold the graphite ring temperature at 1300° C. for about 2:00 minutes; Visually check for sealing between the tubulation and the disk; Cool the graphite ring at about 100° C. per minute until below about 300° C. in order to reduce the stresses developed in the sealing disk and the tubulation wall.

At this point in the exhaust process, a rudimentary test can be performed to assure that the tubulation connected to the envelope is adequately sealed. The test requires that the target be heated briefly to a temperature above the highest temperature used during the "exhaust" process step, which could be as little as about 10° C. above that highest temperature. This addition of heat should cause a rise in total pressure within the envelope because additional outgassing of the anode will occur. If a leak is present in the envelope/tubulation seal at the collapse point, the vacuum system pressure would also rise on the pump side of the seal. No pressure rise, no leak.

At this point the vacuum pump is disconnected from the envelope and any excess tubulation protruding from the envelope will be cut or ground away. A stress check should also be part of the seal-off inspection.

It has also been proposed that the final seal-off step be performed after the x-ray tube manufacture process step known as "Seasoning". "Seasoning" is usually performed after "exhaust" and uses the electron beam source to actually generate X-Rays and heat the target in a rotating, dynamic manner. This manufacturing process step accomplishes what is called "seasoning" of the focal track and verifies the spot size of the electron beam. This step is believed to increase the overall life of the x-ray tuber assembly and also is the final process check for an envelope prior to field installation into an x-ray system.

Using the prior manufacturing process protocol, additional outgassing occurred in the "Seasoning" process step. This was because the prior "Exhaust" process step heats the target bulk temperature to only about 1150° C. Actual operating temperatures of about 1475° C. are reached when the electron beam is in operation. As is known, when a higher temperature is reached, additional outgassing inside the envelope takes place.

If the final seal-off of the tubulation connecting the envelope to the vacuum pump is performed after "Exhaust" and "Seasoning", then any additional outgassing that occurs in the "Seasoning" step is also pumped away or evacuated from the envelope. In the prior manufacturing process, the envelope was sealed prior to "seasoning" and only a very small ion appendage pump, which was attached via a different tubulation, was used to remove gases during the seasoning step. It should be understood that the vacuum generated for exhaust is via a turbomolecular pump and the additional evacuation after the exhaust tubulation was sealed was conducted via the small ion appendage pump.

Example 2

Experiments have shown that the amount of gases evolved by heating from about 1150° C. in the prior "Exhaust" process or step to the full operating temperature of about 1475° C. in the "Seasoning" process or step is enormous and that the small appendage pump previously used was incapable of removing the amount of evolved gases generated during "Seasoning" in a reasonable time period. While it is believed that the methods described above would reduce the initial outgassing generated during the "Seasoning" process, continued high conductance pumping during the "Seasoning" process would then remove any additional outgassing which occurs when the anode is rotated and x-rays are generated.

In one additional new method, the seal-off of the tubulation envelope connection in the above "Exhaust" process or step would be delayed until after the "Seasoning" step was completed. During the "Seasoning" step, the fully operational large diameter tubulation and envelope connection to the vacuum pump would remain in place and in operation. It is believed that by delaying the seal-off until after the "Seasoning" step has been completed, considerable processing time over the prior method described earlier would be saved and the maximum possible envelope vacuum would be achieved.

Several experiments were conducted which verified the feasibility of the utilization of a larger diameter tubulation for the exhaust process step. Unfortunately, as with all new approaches, some initial results were not successful.

Example 3

Seal-off runs 3 and 3*a*.

The sample tube design was revised such that the support rod for the sealing disk was now fixed. In order to prevent thermal shock, a preliminary heating/cooling schedule was devised as follows:

Heat to 700° C. in 2 minutes;

Heat to about 870° C. in about 2:45;

Hold for 1 minute;

Heat to about 1200° C. in about 5:30 minutes;

Heat to about 1300° C. in about 7.00 minutes;

Hold for about 2:00 minutes;

Visually check for sealing of the wall with the disk; and

Cool at about 100° C. per minute until below about 300° C.

Results showed no cracking was visible in the sealed disk or the tube wall. The sealed portion of the tube remained under vacuum. The sealed was He gas leak checked to about $1.0\times10^{-8}$ torr. At this point, the new sealing disk and the new exhausting method had been proven.

The following describes a method for accomplishing a vacuum tubulation seal off when using a metal vacuum envelope to house the anode portion of the x-ray tube and a metal tubulation for connection to the vacuum manifold of the pumping system. As presently envisioned, the x-ray system utilizing a metal envelope would be externally cooled and would most likely not have the oil system, as illustrated in FIGS. 1 and 2. As presently envisioned, the metal envelope will be made of 304L stainless steel with the x-ray window which enables the x-rays to exit the envelope being made of berillium. However, it is believed possible to construct an x-ray tube envelope of about any metal as long as the metal can withstand the temperatures and the stresses generated by the hot rotating mass of the target. Copper, for example, could be used as long as all surfaces of the envelope are actively cooled and it exhibits the strength necessary to operate in the x-ray tube environment. In any event, it is presently envisioned that it will be necessary to actively cool the portion of the envelope that faces the graphite portion of the target, that portion having the highest radiated heat area, and the stationary bearing shaft area.

In this system and method, the vacuum tubulation comprises a length of metal tubing, such as 304L stainless steel. The section of tube attached to the metal envelope, presently preferably 304L stainless steel, but could also be made of any metal that can withstand the x-ray tube environment, is fabricated to include a step in the tube wall so that a sealing disc of matched diameter may seat on it. It is possible that the sealing seat could comprise a ring positioned in a constant bore tubulation to act as the seating seat for the sealing metal disk. Both the metal sealing disc and the step area in the metal tube have been coated, in advance, with a suitable brazing alloy to allow for sealing of the tube after the Exhaust/Seasoning processes have been completed. A metal flange is also connected to allow for connection to the vacuum manifold of the pumping system.

Figure 6A:
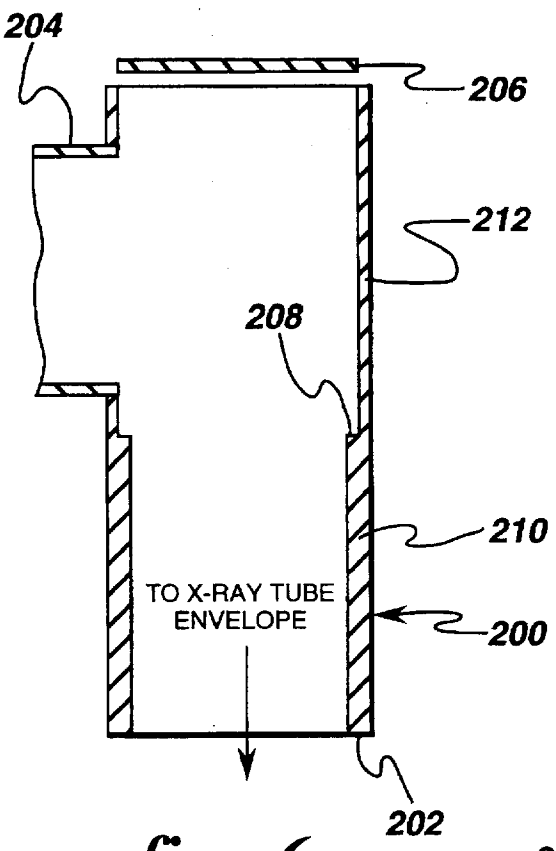
FIG. 6*a* is a schematic representation of a large diameter seal off evacuation system for a metal vacuum tubulation with the system configured in the evacuation position.
Figure 6B:
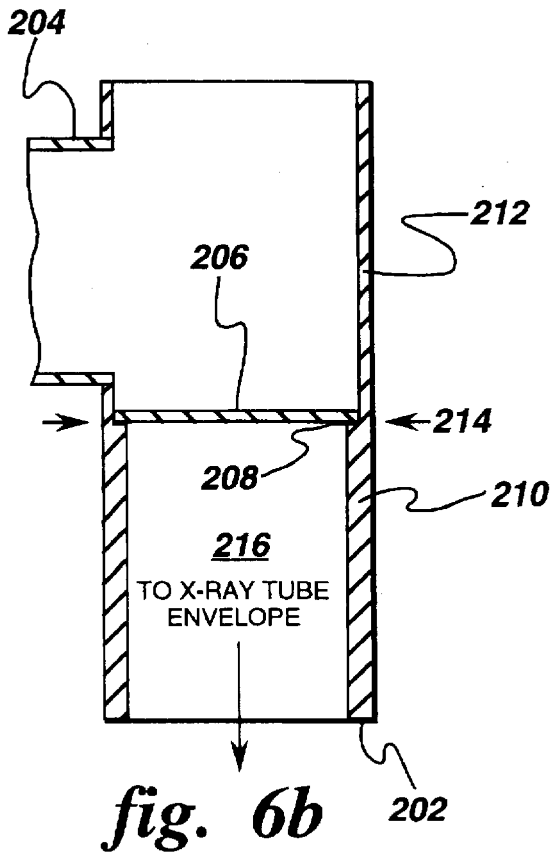
FIG. 6*b* is a schematic representation of a large diameter seal off system of FIG. 6*a* in the seal off position.

The modified tube with the sealing seat is positioned very close to the wall of the metal envelope, presently preferably about 1 to about 5 inches, and a metal seal is formed, as shown in FIG. 6b. It is believed that this system and method can be utilized to seal much larger diameters of tubes than that of the 59 mm tubing used for these experiments.

FIGS. 6a and 6b show the evacuation configuration and the seal-off position of the metal tube section and sealing disc, both of which have been pretinned with a suitable braze alloy in the seal off area. It is believed that any means of heating a short length of the metal tube wall, for example, induction or resistance, should be suitable to accomplish this type of seal off. One benefit of the present invention over the seal off methods (described above, in addition to using a metal envelope, is that the metal seal is much more robust (which is defined as having high structural integrity against damage or to be durable or sturdy) and requires much lower temperatures to form the seal, about 500° C. vs about 1300° C.

FIG. 6a illustrates the configuration of the metal transition section and sealing disc, both of which has been pretinned with a suitable braze alloy in the seal off area.

As described therein, some typical industry standards for vacuum piping includes 304L and 316 type stainless steel. Braze alloys utilized with the methods and systems of the present invention include those in the form of preshaped washers or paintable alloys that are placed in the sealing area prior to creating the vacuum, such as, for example, silver-copper and tin-copper compositions. These and other usable braze alloys are well known in the industry for application with stainless steel materials. Since use of a flux is required to allow for wetting of the stainless steel surfaces, prewetting of the surfaces will be performed in ambient atmosphere and the excess flux cleaned away. The surfaces will then wet to each other when reflowed under the vacuum condition.

FIG. 6a illustrates the metal vacuum tubulation of the present invention. As shown, the metal tubulation 200 is connected to the metal x-ray tube envelope and at the other end 204 to a vacuum pump 112 (see FIG. 5). During the evacuation position, a metal sealing disk pretinned with a braze alloy 206 is operatively positioned opposite the end connected metal envelope. Inside the metal tubulation is a sealing seat 208 pretinned with a braze alloy. This sealing seat 208 is formed in the metal tubulation by decreasing the thickness of the tubulation at a point between the evacuating envelope and the vacuum pump. As shown, the internal diameter of the tubulation at location 210 is less than the internal diameter of the metal tubulation at location 212. When in the evacuation position, the disk 206 forms a seal inside tubulation 200 such that gases being generated inside the x-ray tube metal envelope are evacuated from the metal envelope by the vacuum pump.

When moving the sealing disk into position against the sealing seat, a manipulator arm (not shown), such as, for example, those available from MDC Vacuum Products, may be utilized. The MDC Vacuum manipulator arm is a magnetically coupled rotary/linear transporter rod designed to provide a vacuum seal to 10E-09 torr. Lengths of the extension varies from about 12 to about 36 inches and is of a type 304 stainless steel construction.

FIG. 6b illustrates the configuration of the metal tubulation and sealing disc, both of which has been pretinned with a suitable braze alloy in the seal off area in the seal-off position. Once the sealing disk 206 is in position and resting on the sealing seat 208, heating means 214 are positioned proximate the tubulation wall in order to seal the tubulation by flowing the braze alloy an effectively seal off the vacuum in the sealed vacuum space 216. Any means of heating a short length of the metal tube wall, induction or resistance, should be suitable for accomplishing the seal off of the metal tubulation with the metal envelope. One significant benefit of the metal tubulation method over the seal off method mentioned above is that the metal seal is much more robust and requires much lower temperatures to form the seal, about 500° C. vs. about 1300° C.

The tube wall is heated to a temperature sufficient to cause the braze alloy to reflow and form a vacuum tight seal between the sealing disc and the metal tube. The small differences in diameters allows the braze alloy to flow by capillary action into the joint/interface to effectuate the joint/seal. Once cool, the braze alloy solidifies between the sealing disc and the metal tube to complete the seal-off of the tubulation/envelope connection thereby retaining the vacuum inside the metal envelope.

FIG. 6b illustrates a heating means 214, such as, for example, an induction coil utilized in one method. The induction coil length may be varied to suit the particular x-ray tube envelope seal-off application, or any envelope requiring a faster more complete evacuation/lower vacuum inside thereof.

Power is supplied to the heating means, as illustrated an induction coil, which in turn heats the stainless steel tubulation to a temperature sufficient to cause the illustrated braze alloy to reflow while under vacuum. The sealing disk 206 which is positioned within the metal tubulation portion 210 at the location of the desired seal between the glass envelope and metal the tubulation is in turn heated. The temperature of the metal tubulation portion may be monitored by an optical pyrometer or other known means for monitoring temperature.

As the temperature of the localized region of the tubulation wall rises, the braze alloy begins to flow and through capillary action is pulled into the joint created by the tubulation wall and the outer diameter surface of the sealing disk. This temperature is held for sufficient time to provide for good wetting of the tubulation wall to the sealing disk. The temperature may then be lowered to allow the braze alloy to solidify.

Next, a leak check may be performed by raising the temperature of the anode, briefly, to a temperature of about 10° to about 20° C. higher than it was exposed to during the exhaust process. This increases the temperature inside the metal envelope to a level not previously attained and, thus, will evolve additional gases thereby increasing the pressure in the metal envelope. If the seal is incomplete, the pressure on the pump side of the seal will increase. If the seal is successful, the excess metal tube may then be cut away and ground to eliminate sharp edges.

While the systems and methods contained herein constitute preferred embodiments of the invention, it is to be understood that the invention is not limited to these precise systems and methods, and that changes may be made therein without departing from the scope of the invention which is defined in the appended claims.

What is claimed is:

1. A method for exhausting a metal x-ray tube envelope utilizing a large diameter metal tubulation comprising the steps of:

providing a metal tubulation having a diameter greater than about 20 mm, a braze alloy being operatively positioned inside the tubulation;

operatively connecting the metal tubulation to the metal x-ray tube envelope;

providing a metal disk having a braze alloy being operatively positioned thereon inside the tubulation, the metal disk having a smaller diameter than at least one portion of the tubulation;

providing a vacuum to the metal tubulation;

heating an anode of the x-ray tube envelope inside the x-ray tube envelope to a temperature of about 1500° C.;

positioning heating means proximate the outside of the metal tubulation;

positioning the metal disk inside the metal tubulation proximate the position of the heating means on the outside of the metal tubulation;

heating the metal tubulation proximate the metal disk to a temperature sufficient so as allow the braze to reflow and form a bond between the metal tubulation and the metal disk;

checking for sealing contact between the metal tubulation and the metal disk; and cooling the metal tubulation/metal disk interface to a temperature sufficient to bond the metal tubulation to the metal disk.

2. The method of claim 1 wherein the time duration between the anode heating step and the end of the cooling step is less than about twenty five (25) hours.

3. The method of claim 1 wherein the time duration between the anode heating step and the end of the cooling step is from about ten (10) hours to about twenty five (25) hours.

4. The method of claim 1 wherein the time duration between the anode heating step and the end of the cooling step is about ten (10) hours.

5. The method of claim 1 wherein the metal tubulation/metal disk interface is cooled to a temperature of about 28° C.

6. The method of claim 1 further comprising the step of:

after the cooling step, checking a seal between the metal tubulation and the metal envelope by heating the anode inside the envelope to a temperature at least 10° C. above the highest temperature that the anode was heated to during the anode heating step.

7. The method of claim 6 wherein the providing a vacuum provides a pump on a pump side of the seal, where if the vacuum system pressure rises on the pump side of the seal, the seal is defective.

8. The method of claim 6 wherein the providing a vacuum provides a pump on a pump side of the seal, where if the vacuum system pressure does not rise on the pump side of the seal, the seal is leak free.

9. A method for exhausting and seasoning a metal x-ray tube envelope utilizing a large diameter metal tubulation comprising the steps of:

providing a metal tubulation having a diameter greater than about 20 mm;

operatively connecting the metal tubulation to the glass x-ray tube envelope;

providing a metal disk inside the metal tubulation, the metal disk having a smaller diameter than the metal tubulation;

providing a vacuum to the metal tubulation;

operating the x-ray tube envelope to generate x-rays and generate temperatures inside the x-ray tube glass envelope of about 1500° C.;

positioning heating means on the outside of the metal tubulation;

positioning the metal disk inside the metal tubulation proximate the position of the heating means on the outside of the metal tubulation;

heating the metal tubulation proximate the metal disk to about 500° C.;

checking for sealing contact between the metal tubulation and the metal disk; and cooling the metal tubulation proximate the metal disk to a temperature sufficient to seal the metal tubulation to the metal disk.

10. The method of claim 9 wherein the time duration between the anode heating step and the end of the cooling step is less than about twenty five (25) hours.

11. The method of claim 9 wherein the time duration between the anode heating step and the end of the cooling step is from about ten (10) hours to about twenty five (25) hours.

12. The method of claim 9 wherein the time duration between the anode heating step and the end of the cooling step is about ten (10) hours.

13. The method of claim 9 wherein the metal tubulation/metal disk interface is cooled to a temperature of about room temperature.

14. The method of claim 9 further comprising the step of:

after the cooling step, checking a seal between the metal tubulation/metal disk and the metal envelope by heating the anode to a temperature at least 10° C. above the highest temperature that the anode was heated to during the anode heating step.

15. The method of claim 14 wherein the providing a vacuum provides a pump on a pump side of the seal, where if the vacuum system pressure rises on the pump side of the seal, the seal is defective.

16. The method of claim 14 wherein the providing a vacuum provides a pump on a pump side of the seal, where if the vacuum system pressure does not rise on the pump side of the seal, the seal is leak free.

17. A system for exhausting an x-ray tube metal envelope utilizing a large diameter metal tubulation and a metal disk, the metal tubulation having a diameter greater than about 20 mm, and being operatively connected to the metal x-ray tube envelope;

the metal disk, operatively positioned inside the metal tubulation, having a smaller diameter than at least one portion of the metal tubulation; the system comprising:

a vacuum operatively connected to the metal tubulation;

means for heating an anode of the x-ray tube envelope to a temperature inside the x-ray tube metal envelope to about 1500° C.;

means for positioning the metal disk inside the metal tubulation;

heating means, operatively positioned on the outside of the metal tubulation, for heating the metal tubulation proximate the metal disk to a temperature sufficient to bond the metal tubulation to the metal disk;

means for checking for sealing contact between the metal tubulation and the metal disk; and means for cooling the metal tubulation/metal disk interface until the metal tubulation and the metal disk have bonded.

18. A system for exhausting an x-ray tube metal envelope utilizing a large diameter metal tubulation and a metal disk, the metal tubulation having a diameter greater than about 20 mm operatively connected to the x-ray tube metal envelope;

the metal disk, operatively positioned inside the metal tubulation, having a smaller diameter than at least one portion of the metal tubulation; the system comprising:

a vacuum operatively connected to the metal tubulation;

means, operatively connected to an anode of the x-ray tube envelope, for heating the anode inside the metal envelope to a temperature of about 1500° C.;

heating means, operatively positioned proximate the outside of the metal tubulation, for bonding the metal tubulation to the metal disk to form a metal tubulation/metal disk interface;

means, operatively connected to the metal disk, for positioning the metal disk inside the metal tubulation proximate the position of the heating means on the outside of the metal tubulation; and cooling means, operatively positioned relative to the metal tubulation/metal disk interface, for cooling the metal tubulation/metal disk interface to a temperature sufficient to seal the metal tubulation to the metal disk.

19. The system of claim 18 wherein the time duration between the anode being heated and the sealing of the metal tubulation to the metal disk is less than about twenty five (25) hours.

20. The system of claim 18 wherein the time duration between the anode being heated and the sealing of the metal tubulation to the metal disk is from about ten (10) hours to about twenty five (25) hours.

21. The system of claim 18 wherein the time duration between the anode being heated and the sealing of the metal tubulation to the metal disk is about ten (10) hours.

22. The system of claim 18 further comprising:

means for heating the anode to a temperature at least 10° C. above the highest previous anode temperature.

23. The system of claim 22 further comprising the vacuum comprising a pump on a pump side of the metal tubulation/metal disk interface, and;

means, operatively connected to the pump and the envelope, for detecting a pressure rise on the pump side of the metal tubulation/metal disk interface seal and the glass envelope.

* * * * *